US010938270B2

(12) United States Patent
Nakajima et al.

(10) Patent No.: US 10,938,270 B2
(45) Date of Patent: Mar. 2, 2021

(54) SPINDLE MOTOR

(71) Applicant: MINEBEA MITSUMI Inc., Nagano (JP)

(72) Inventors: Daigo Nakajima, Tomi (JP); Hideaki Showa, Kitasaku-gun (JP); Daisuke Ito, Saku (JP)

(73) Assignee: MINEBEA MITSUMI INC., Nagano (JP)

( * ) Notice: Subject to any disclaimer, the term of this patent is extended or adjusted under 35 U.S.C. 154(b) by 37 days.

(21) Appl. No.: 16/372,556

(22) Filed: Apr. 2, 2019

(65) Prior Publication Data

US 2019/0305635 A1 Oct. 3, 2019

(30) Foreign Application Priority Data

Apr. 3, 2018 (JP) .............................. JP2018-071953

(51) Int. Cl.
*H02K 5/24* (2006.01)
(52) U.S. Cl.
CPC ...................................... *H02K 5/24* (2013.01)
(58) Field of Classification Search
CPC .............................. H02K 5/24; H02K 1/2786
USPC ...................................................... 310/51, 90
See application file for complete search history.

(56) References Cited

U.S. PATENT DOCUMENTS 9,065,315 B1 * 6/2015 Ochitani .................. H02K 1/30
2007/0058291 A1 * 3/2007 Shirai .................. G11B 25/043
360/99.08

FOREIGN PATENT DOCUMENTS

JP 11-288551 A 10/1999

* cited by examiner

*Primary Examiner* — Thomas Truong
(74) *Attorney, Agent, or Firm* — Pearne & Gordon LLP

(57) ABSTRACT

A spindle motor according to one aspect of the present disclosure includes: a hub; a yoke; a rotor magnet; and a stator. The hub is formed in a cup shape having a hub cylindrical part extending in an axial direction and a disk part extending radially inward from an end of the hub cylindrical part. The yoke being arranged on radially inward of the hub is formed in an annular shape having a yoke cylindrical part facing the hub cylindrical part and a yoke flange part facing the disk part and extending radially inward from the one end of the hub cylindrical part. The disk part includes an adhesive part with the yoke flange part being fixed via an adhesive and a peripheral groove being formed on radially outward of the adhesive part. The adhesive is not present on radially outward of the peripheral groove, and the hub cylindrical part and the yoke cylindrical part do not contact each other.

8 Claims, 7 Drawing Sheets

SPINDLE MOTOR

CROSS REFERENCE TO RELATED APPLICATIONS

This application claims the benefit of Japanese Patent Application No. 2018-071953, filed Apr. 3, 2018, which is hereby incorporated by reference in its entirety.

BACKGROUND

Technical Field

The present disclosure relates to a spindle motor.

BACKGROUND

Conventionally, a spindle motor has been used for rotating a hard disk of a hard disk drive. The spindle motor includes, for example, a baseplate, a shaft supported by the baseplate, a stator fixed on the baseplate, and a rotor rotatably supported by the shaft. In the rotor, a hub is rotatably supported by the shaft, and on an inner peripheral surface of the hub, a yoke and a rotor magnet are fixed so as to face the stator. In Japanese Patent Application Laid-Open No. H11-288551, technology for absorbing rotational vibration by filling a space between the rotor magnet and the hub with resin is disclosed.

In the hard disk drive, vibration of higher order frequency (for example, a 55 to 75 kHz band) generated between the stator and the rotor magnet may be transmitted to the hub and the higher order frequency vibration may also be generated on a disk attached to the hub. In recent years, due to the increase in the capacity of the disk, the higher order frequency vibration on the disk became a risk to cause reduction in the reading/writing speed of the disk. Therefore, reducing the higher order frequency vibration of the hub in the hard disk drive has been strongly demanded.

The present disclosure is related to providing technology enabling to reduce the higher order frequency vibration of the hub.

SUMMARY

A spindle motor according to one aspect of the present disclosure includes: a hub; a yoke; a rotor magnet; and a stator. The hub is formed in a cup shape having a hub cylindrical part extending in an axial direction and a disk part extending from an end of the hub cylindrical part toward an inner side in a radial direction. The yoke arranged on an inner side of the hub in the radial direction is formed in an annular shape having a yoke cylindrical part facing the hub cylindrical part and a yoke flange part facing the disk part and extending radially inward from the one end of the hub cylindrical part. The disk part includes an adhesive part with the yoke flange part being fixed via an adhesive and a peripheral groove recessed in the axial direction which is formed on radially outward of the adhesive part. The adhesive is not present on radially outward of the peripheral groove, and the hub cylindrical part and the yoke cylindrical part do not contact each other.

In the spindle motor according to the one aspect of the present disclosure, a surface of the adhesive cured in the peripheral groove is exposed inside the peripheral groove.

In the spindle motor according to the one aspect of the present disclosure, the depth of peripheral groove in the axial direction continuously increases toward an outer side in the radial direction in a portion from an edge portion up to a deepest portion of the peripheral groove.

In the spindle motor according to the one aspect of the present disclosure, the disk part includes a projecting part with the yoke flange part being fitted on an inner side of the peripheral groove in the radial direction.

In the spindle motor according to the one aspect of the present disclosure, the adhesive part includes the projecting part.

The spindle motor according to the present disclosure enables to reduce the higher order frequency vibration of the hub.

DETAILED DESCRIPTION

Hereinafter, embodiments of the present disclosure will be described with reference to the accompanying drawings.

Figure 1:
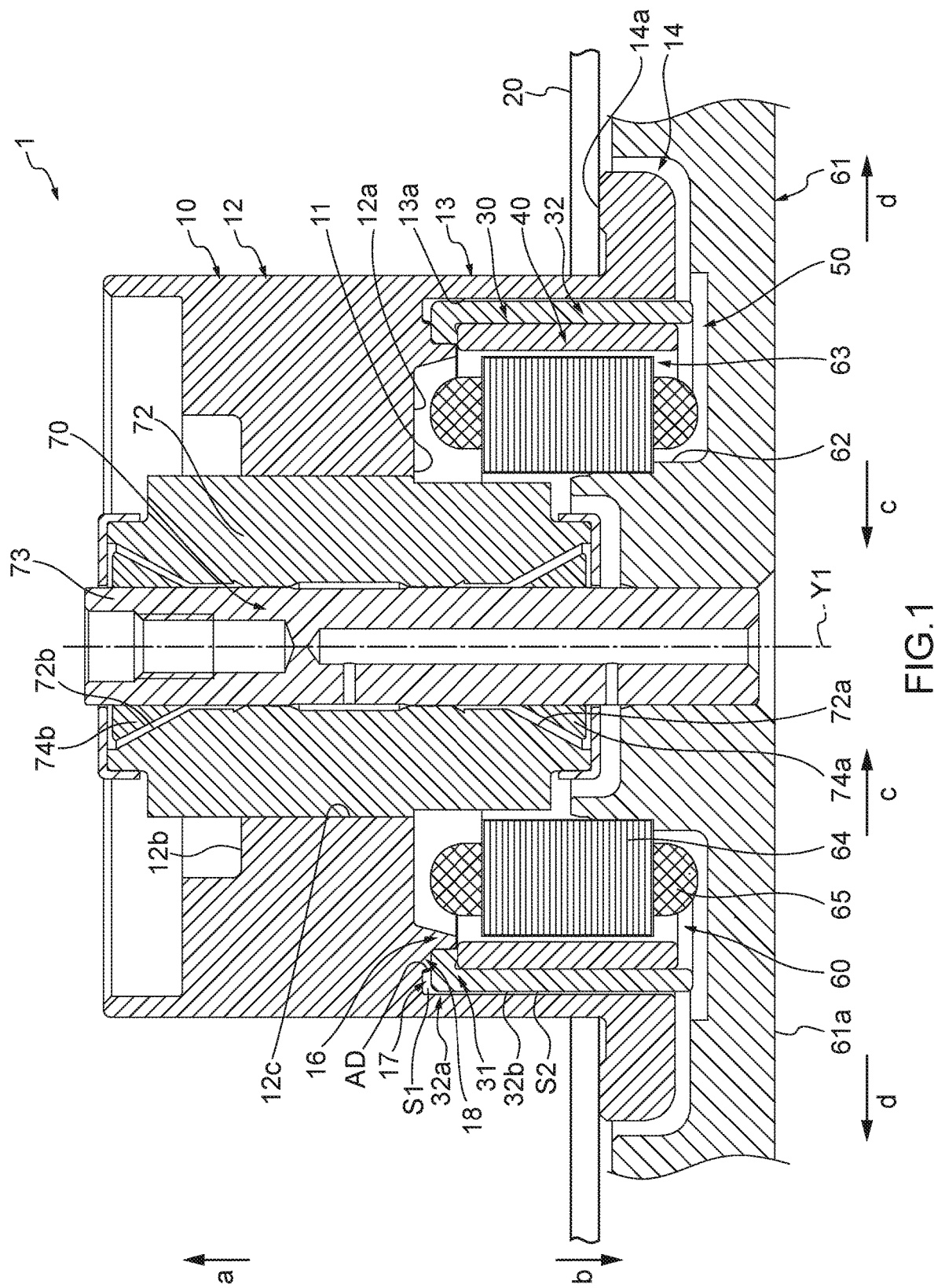
FIG. 1 is a cross-sectional view schematically showing a configuration of a spindle motor according to a first embodiment of the present disclosure.
Figure 2:
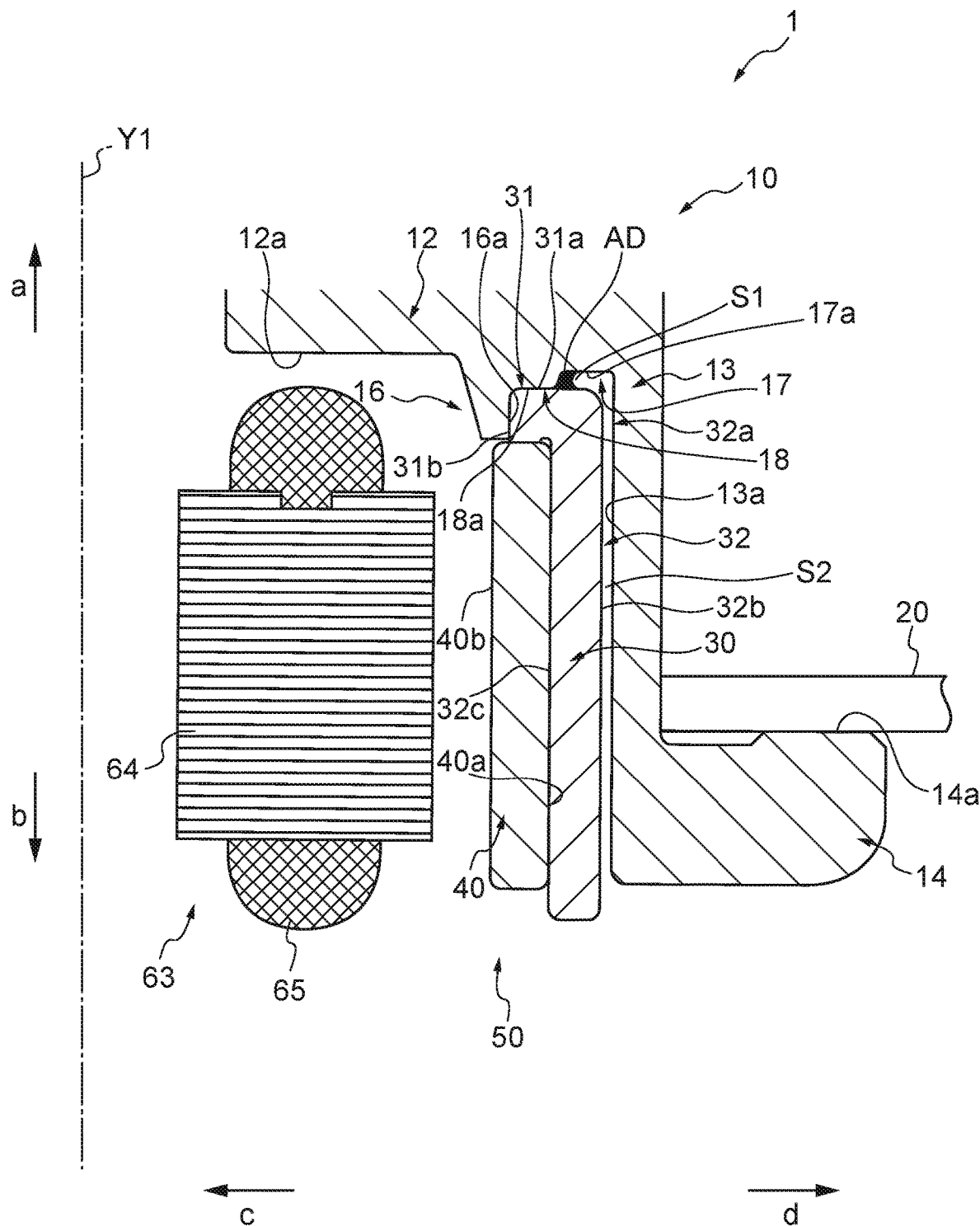
FIG. 2 is a partially enlarged cross-sectional view schematically showing a configuration of a rotor part shown in FIG. 1.

FIG. 1 is a cross-sectional view schematically showing a configuration of a spindle motor 1 according to a first embodiment of the present disclosure. FIG. 2 is a partially enlarged cross-sectional view schematically showing a configuration of a rotor part 50 of the spindle motor 1. Hereinafter, in order to facilitate the description, one side (arrow a direction) of an axis Y1 direction of the spindle motor 1 in FIG. 1 (hereinafter, also referred to as an axial direction) is defined as the upper side and another side (arrow b direction) of the axis Y1 direction is defined as the lower side. In addition, one side (arrow c direction) of a radial direction extending orthogonally to the axis Y1 is defined as the inner side, and another side (arrow d direction) of the radial direction extending orthogonally to the axis Y1 is defined as the outer side. In the below description, when positional relationship and directions are described by using terms of an upper and a lower, the positional relationship and the directions show relationship and directions merely in the drawings and do not show the actual positional relationship and directions of the spindle motor 1 incorporated into an actual apparatus.

The spindle motor 1 according to the first embodiment of the present disclosure includes a hub 10, a yoke 30, a rotor magnet 40, and a stator 63. The hub 10 is formed in a cup shape having a hub cylindrical part 13 extending in the axial direction (in the arrows a and b directions) and a disk part 12 extending from one end of the hub cylindrical part 13 toward the inner side in the radial direction (arrow c direction). The yoke 30 arranged on the inner side of the hub 10 in the radial direction is formed in an annular shape having a yoke cylindrical part 32 facing the hub cylindrical part 13 and a yoke flange part 31 facing the disk part 12 and extending radially inward from the one end of the yoke cylindrical part 32. The disk part 12 includes an adhesive part (a projecting part 16 and a yoke supporting part 18) with a yoke flange part 31 fixed via an adhesive AD and a peripheral groove 17 which is recessed in the axial direction and formed on a radially outward (arrow d direction) of the adhesive part. The adhesive AD is not present on radially outward of the peripheral groove 17. The hub cylindrical part 13 and the yoke cylindrical part 32 do not contact each other. Hereinafter, the configuration of the spindle motor 1 will be specifically described.

As shown in FIG. 1, the spindle motor 1 includes a rotor part 50, a stator part 60, and a fluid dynamic bearing mechanism (hereinafter, a bearing mechanism) 70 utilizing a fluid dynamic pressure of a lubricant (not shown). In the spindle motor 1, the rotor part 50 is supported rotatably with respect to the stator part 60 via the bearing mechanism 70.

The stator part 60 includes a baseplate 61 being a part of a housing of the spindle motor 1 and the stator 63 attached in the outer circumferential surface of a cylindrical boss part 62 provided on the baseplate 61. The stator 63 is configured by winding a coil 65 onto a stator core 64. Note that on a surface (outer surface 61a) in the lower side (arrow b direction) of the baseplate 61, a flexible printed circuit board (not shown) is attached, and a control current is supplied from an output terminal of the flexible printed circuit board to the stator 63.

A first conical bearing member 74a and a second conical bearing member 74b having conical outer surfaces are fixed onto the shaft 73 spaced apart from each other in the axial direction. The rotor part 50 includes a sleeve 72 having a shaft insertion hole, the hub 10 fixed on the outer side of the sleeve 72, the yoke 30, and the rotor magnet 40. The shaft 73 is inserted into the shaft insertion hole of the sleeve 72. The yoke 30 and the rotor magnet 40 are fixed to the hub 10.

The shaft insertion hole of the sleeve 72 have respectively a first conical inner surface 72a and a second conical inner surface 72b at the end portions. The first conical inner surface 72a and the first conical bearing member 74a face each other via a minute gap. In addition, the second conical inner surface 72b and the second conical bearing member 74b face each other via a minute gap. The minute gap between the first conical bearing member 74a and the first conical inner surface 72a, and the minute gap between the second conical bearing member 74b and the second conical inner surface 72b are filled with a lubricant, respectively.

Further, on at least either one of conical outer surfaces of the first conical inner surface 72a and the second conical inner surface 72b or the first conical bearing member 74a and the second conical bearing member 74b, a dynamic pressure generating groove is formed, and the bearing mechanism 70 based on the fluid dynamic bearing is formed. In the above-described configuration, upon the rotation, the rotor part 50 is supported onto the baseplate 61 via the bearing mechanism 70 based on the fluid dynamic bearing.

On the baseplate 61, the stator core 64 wound with the coil 65 is fixed so as to face the rotor magnet 40. The rotor magnet 40 is a permanent magnet magnetized with polarity reversed in a peripheral direction. The yoke 30 suppresses leakage of the magnetic flux from the rotor magnet 40. The stator core 64 has a configuration formed by laminating electromagnetic steel sheets each processed to have an annular shape. The stator core 64 is located at the outer side (arrow d direction) of the bearing mechanism 70. Plurality of pole teeth are provided in a peripheral direction of the stator core 64 spaced apart from one another. Each of the pole teeth is wound with the coil 65. A lead wire is drawn out from the coil 65 and is connected to the flexible printed circuit board.

By applying an electrical current to the coil 65 and switching the polarity of the coil 65, a magnetic attraction force and a magnetic repulsion force generated between the rotor magnet 40 and the pole teeth of the stator core 64 switch and thus, the rotor part 50 rotates in relation to the baseplate 61 around the shaft 73 fixed to the baseplate 61. The rotor part 50 rotating at a high speed generates a dynamic pressure in the bearing mechanism 70. By this way, the rotor part 50 rotates while being supported by the shaft 73, the first conical bearing member 74a, and the second conical bearing member 74b in a non contact state.

The hub 10 is a member having a cup shape (bottomed cylindrical shape), and a housing part 11 which is a recessed portion with a predetermined depth formed from the lower side toward the upper side so as to house the stator 63. Specifically, the hub 10 is formed in a cup shape having a hub cylindrical part 13 extending in the axial direction and being of a cylindrical shape and a disk part 12 extending radially inward (arrow c direction) from the end portion at the upper side of the hub cylindrical part 13 and being of a disk shape.

On the end portion of the hub cylindrical part 13 at the lower side, a hub flange part 14 with an annular shape and extending radially outward (arrow d direction) is provided. A disk 20 is attached on a mounting surface 14a which is the upper side of the hub flange part 14, and the disk 20 rotates together with the rotor part 50.

The disk part 12, the hub cylindrical part 13, and the hub flange part 14 are coaxially arranged with the axis Y1 as the central axis. The disk part 12, the hub cylindrical part 13, and the hub flange part 14 are formed in one piece. The disk part 12, the hub cylindrical part 13, and the hub flange part 14 may be formed of metal, for example, an aluminum alloy, a stainless steel or the like. Note that, optionally, each or any of the disk part 12, the hub cylindrical part 13, and the hub flange part 14 may be formed as a separated piece, and each or any of the disk part 12, the hub cylindrical part 13, and the hub flange part 14 may be formed of a different material or materials.

In the center of the disk part 12, a through-hole 12c is formed passing through the disk part 12 between a surface (lower surface 12a) on the lower side of the disk part 12 and a surface (upper surface 12b) on the upper side of the disk part 12. The sleeve 72 inserted with the shaft 73 is fitted into the through-hole 12c of the disk part 12. The disk part 12, the shaft 73, and the sleeve 72 are coaxially arranged with the axis Y1 as the central axis. An outer peripheral surface of the sleeve 72 is fixed to the through-hole 12c contacting an inner peripheral surface of the through-hole 12c.

The lower surface 12a of the disk part 12 includes the adhesive part with the yoke flange part 31 of the yoke 30 fixed via the adhesive AD. The adhesive part of the spindle motor 1 according to the first embodiment of the present disclosure includes the projecting part 16 and the yoke supporting part 18. The projecting part 16 projects from the lower surface 12 toward the lower side (arrow b direction). The projecting part 16 extends in an annular shape with the axis Y1 as the central axis. The projecting part 16 is provided radially inward (arrow c direction) of an inner peripheral surface 13a of the hub cylindrical part 13 and radially outward (arrow d direction) of the through-hole 12c of the disk part 12. The projecting part 16 and the hub cylindrical part 13 are coaxially arranged with the axis Y1 as the central axis.

In addition, on the lower surface 12a, the yoke supporting part 18 projects toward the lower side (arrow b direction). The yoke supporting part 18 extends in an annular shape with the axis Y1 as the central axis. The yoke supporting part 18 is formed on the outer side (in the arrow d direction) of the projecting part 16 and is connected to an outer peripheral surface 16a (shown in FIG. 2) of the projecting part 16. The height of the yoke supporting part 18 in the axial direction is lower than the height of the projecting part 16 in the axial direction.

As shown in FIG. 2, the yoke supporting part 18 has a supporting surface 18a facing the yoke 30 and supporting the yoke 30. The supporting surface 18a is an annular surface having a width in the radial direction and formed on an end portion of the yoke supporting part 18 and supports the yoke 30 in the axial direction. The yoke supporting part 18 and the projecting part 16 are coaxially arranged with the axis Y1 as the central axis.

The adhesive AD is present in an annular shape around the axis Y1 on the supporting surface 18a of the yoke supporting part 18, on at least one part of the upper side of the outer peripheral surface 16a, and on at least one part of the inside of the peripheral groove 17. The adhesive AD is not present on radially outward (arrow d direction) of the peripheral groove 17, and a surface of the cured adhesive AD is exposed inside the peripheral groove 17.

In addition, on the lower surface 12a of the disk part 12, the peripheral groove 17 is recessed in the axial direction toward the upper side (arrow a direction). The peripheral groove 17 (recessed portion) extends in an annular shape with the axis Y1 as the central axis. The peripheral groove 17 is formed on radially outward (arrow d direction) of the yoke supporting part 18 and is formed on radially inward (arrow c direction) of the inner peripheral surface 13a of the hub cylindrical part 13. The peripheral groove 17 is formed between the yoke supporting part 18 and the hub cylindrical part 13 and is connected to the yoke supporting part 18 and the hub cylindrical part 13.

A bottom surface 17a of the peripheral groove 17 is formed on the lower side of the lower surface 12a of the disk part 12 and on the upper side of the supporting surface 18a of the yoke supporting part 18. A portion from an edge portion on the inner side of the peripheral groove 17 up to the deepest portion (bottom surface 17a) of the peripheral groove 17 is formed to be an inclined portion (inclined surface) continuously increasing in depth toward the radially outer side (arrow d direction). This shape of the peripheral groove 17 enables the adhesive AD applied to the inner side of the peripheral groove 17 filling the gap between the yoke 30 and the peripheral groove 17 from the inner side of the peripheral groove 17.

The peripheral groove 17 and the hub cylindrical part 13 are coaxially arranged with the axis Y1 as the central axis. The surface of the adhesive AD remained and cured in the peripheral groove 17 is exposed in the peripheral groove 17. In other words, the adhesive AD is not present in the hub cylindrical part 13 located on radially outer side of the peripheral groove 17.

The yoke 30 is a member having a short side portion (yoke flange part 31) and a long side portion (yoke cylindrical part 32) and having an L-shape or a substantially L-shape in the cross-sectional view. When the yoke 30 is fitted into the hub 10, a gap S1 is formed between the yoke 30 and the bottom surface 17a of the peripheral groove 17 and a gap S2 is formed between the yoke 30 and the hub 10. The yoke 30 is bonded to the projecting part 16 and the yoke supporting part 18 via the adhesive AD and is not bonded to the inner peripheral surface 13a of the hub cylindrical part 13 via the adhesive AD.

Specifically, the yoke 30 has the yoke cylindrical part 32 having a cylindrical shape extending in the axial direction so as to face the hub cylindrical part 13, and the yoke flange part 31 having an annular shape and extending toward the inner side (in the arrow c direction) from the end portion on the upper side (upper end portion 32a) of the yoke cylindrical part 32.

At least one part of the inner side of a surface on the upper side (upper end surface 31a) of the yoke flange part 31 faces the supporting surface 18a of the yoke supporting part 18, and is supported contacting the supporting surface 18a. At least one part of the outer side of the upper end surface 31a of the yoke flange part 31 faces the bottom surface 17a of the peripheral groove 17, and the gap S1 in the axial direction is formed between at least one part of the outer side of the upper end surface 31a and the bottom surface 17a.

The surface on the inner side (inner peripheral surface 31b) of the yoke flange part 31 faces the outer peripheral surface 16a of the projecting part 16. The diameter of the inner peripheral surface 31b of the yoke flange part 31 is smaller than the diameter of the outer peripheral surface 16a of the projecting part 16. Accordingly, the inner peripheral surface 31b is fitted to the outer peripheral surface 16a with interference.

The hub cylindrical part 13 and the yoke cylindrical part 32 do not contact each other. Specifically, the width of the yoke flange part 31 in the radial direction is smaller than the total of the width of the supporting surface 18a of the yoke supporting part 18 in the radial direction and the width of the peripheral groove 17 in the radial direction. Accordingly, between the outer peripheral surface 32b of the yoke cylindrical part 32 and the inner peripheral surface 13a of the hub cylindrical part 13, the gap S2 is formed in the radial direction and the gap S2 communicates with the peripheral groove 17.

The upper end surface 31a is bonded to the supporting surface 18a by the adhesive AD. At least one part of the upper side of the inner peripheral surface 31b is bonded to the outer peripheral surface 16a by the adhesive AD. The adhesive AD remains in one part of the inner side between at least one part of the upper end surface 31a and the bottom surface 17a. The adhesive AD does not reach the inner peripheral surface 13a of the hub cylindrical part 13 and the peripheral groove 17 is not filled completely with the adhesive AD. Note that although the whole of the peripheral groove 17 may be filled with the adhesive AD, the adhesive AD should not reach the gap S2 beyond the peripheral groove 17.

The rotor magnet 40 is a multipolar magnetized member with a cylindrical shape, extending in the axial direction. The outer peripheral surface 40a of the rotor magnet 40 is fixed onto the inner peripheral surface 32c of the yoke cylindrical part 32. The inner peripheral surface 40b of the rotor magnet 40 faces the stator 63 in the radial direction. The rotor magnet 40 and the yoke 30 are coaxially arranged with the axis Y1 as the central axis.

Figure 3:
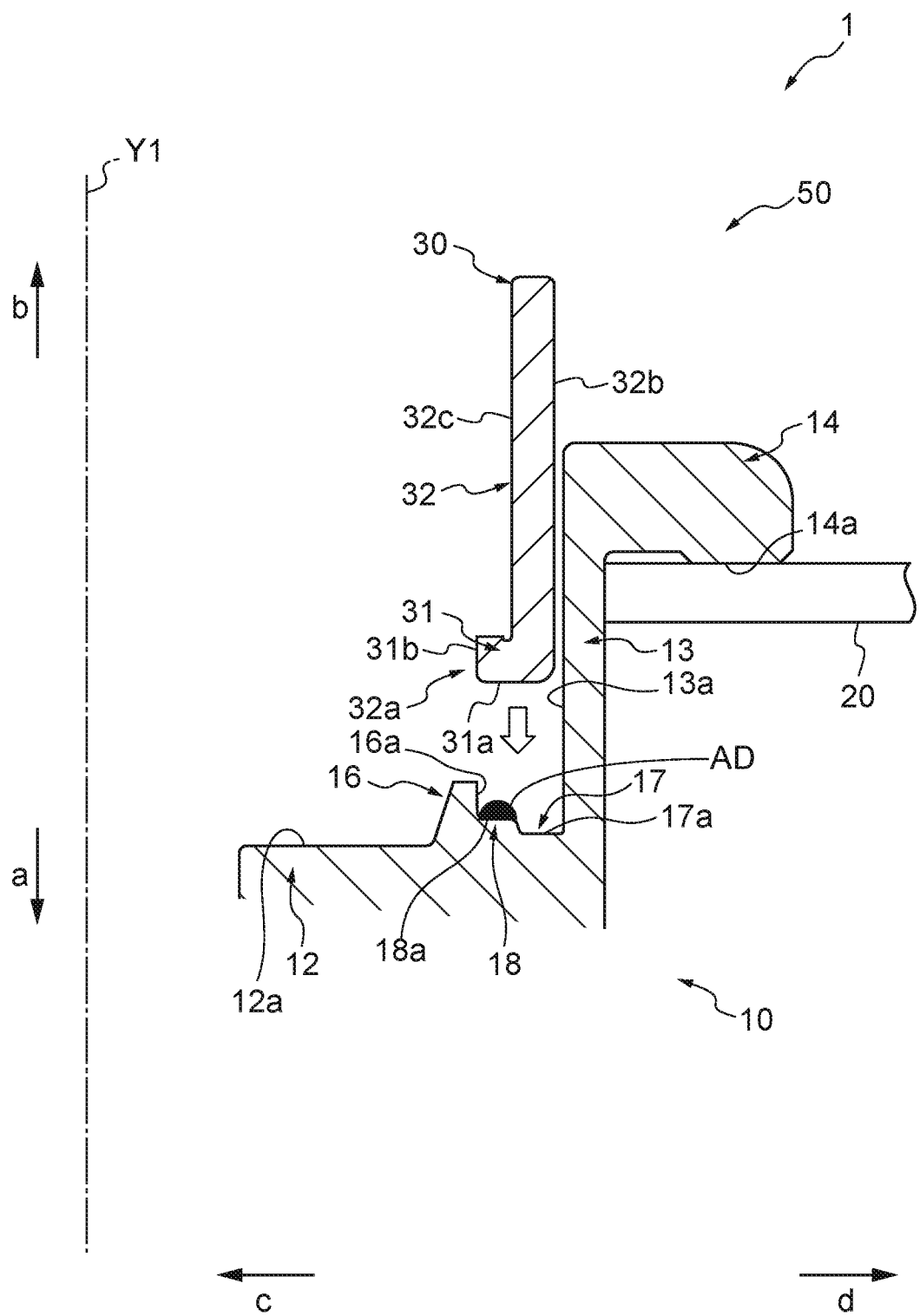
FIG. 3 is a diagram illustrating a method of attaching a yoke and a hub shown in FIG. 1.

Subsequently, a method of attaching the yoke 30 and the hub 10 in the spindle motor 1 having the above-described configuration will be described. FIG. 3 is a diagram illustrating the method of attaching the yoke 30 and the hub 10 in the spindle motor 1 according to the first embodiment of the present disclosure. First, as shown in FIG. 3, the upper side and the lower side of the hub 10 are reversed in relation to the position in FIG. 2. The adhesive AD is dropped or applied to the supporting surface 18a of the yoke supporting part 18.

The amount of the adhesive AD is adjusted to an amount such that the adhesive AD remains between at least one part of the upper end surface 31a of the yoke flange part 31 and the supporting surface 18a of the yoke supporting part 18, in at least one part of the upper side between the inner peripheral surface 31b of the yoke flange part 31 and the outer peripheral surface 16a of the projecting part 16, and in at least one part of the inner side of the gap between at least one part of the upper end surface 31a and the bottom surface 17a of the peripheral groove 17.

Subsequently, the yoke 30 is fitted with interference to the outer peripheral surface 16a such that the inner peripheral surface 31b contacts the outer peripheral surface 16a, and the adhesive AD is cured. Thus, at least one part of the inner side of the upper end surface 31a is supported onto the supporting surface 18a so as to contact the supporting surface 18a via the cured adhesive AD. Since the diameter of the inner peripheral surface 31b is smaller than the diameter of the outer peripheral surface 16a, the yoke 30 can be fitted with interference into the projecting part 16 of the hub 10. In addition, the outer peripheral surface 16a and the inner peripheral surface 31b are bonded to each other by the adhesive AD applied between the outer peripheral surface 16a and the inner peripheral surface 31b.

As described above, in the spindle motor 1 according to the first embodiment of the present disclosure, the disk part 12 includes the adhesive part (the projecting part 16 and the yoke supporting part 18) with the yoke flange part 31 fixed via the adhesive AD and the peripheral groove 17 formed on radially outward (arrow d direction) of the adhesive part (the projecting part 16 and the yoke supporting part 18). At this time, the adhesive AD is not present on radially outward (arrow d direction) of the peripheral groove 17, and the hub cylindrical part 13 and the yoke cylindrical part 32 do not contact each other.

The stress generated in the hub 10 can be reduced by avoiding the contact between the hub cylindrical part 13 and the yoke cylindrical part 32, and reducing the contact area between the yoke 30 and the hub 10. Vibration of the higher order frequency (for example, 55 to 75 kHz band) is caused by rotational vibration generated between the stator 63 and the rotor magnet 40. When the rotor magnet 40 vibrates, the vibration is transmitted to the hub 10 via the yoke 30. Therefore, reducing the contact area between the yoke 30 and the hub 10 results in reducing the transmission of vibration of the higher order frequency to the hub 10. Consequently, the generation of vibration of the higher order frequency on the disk 20 attached to the hub 10 is also reduced.

Figure 4:
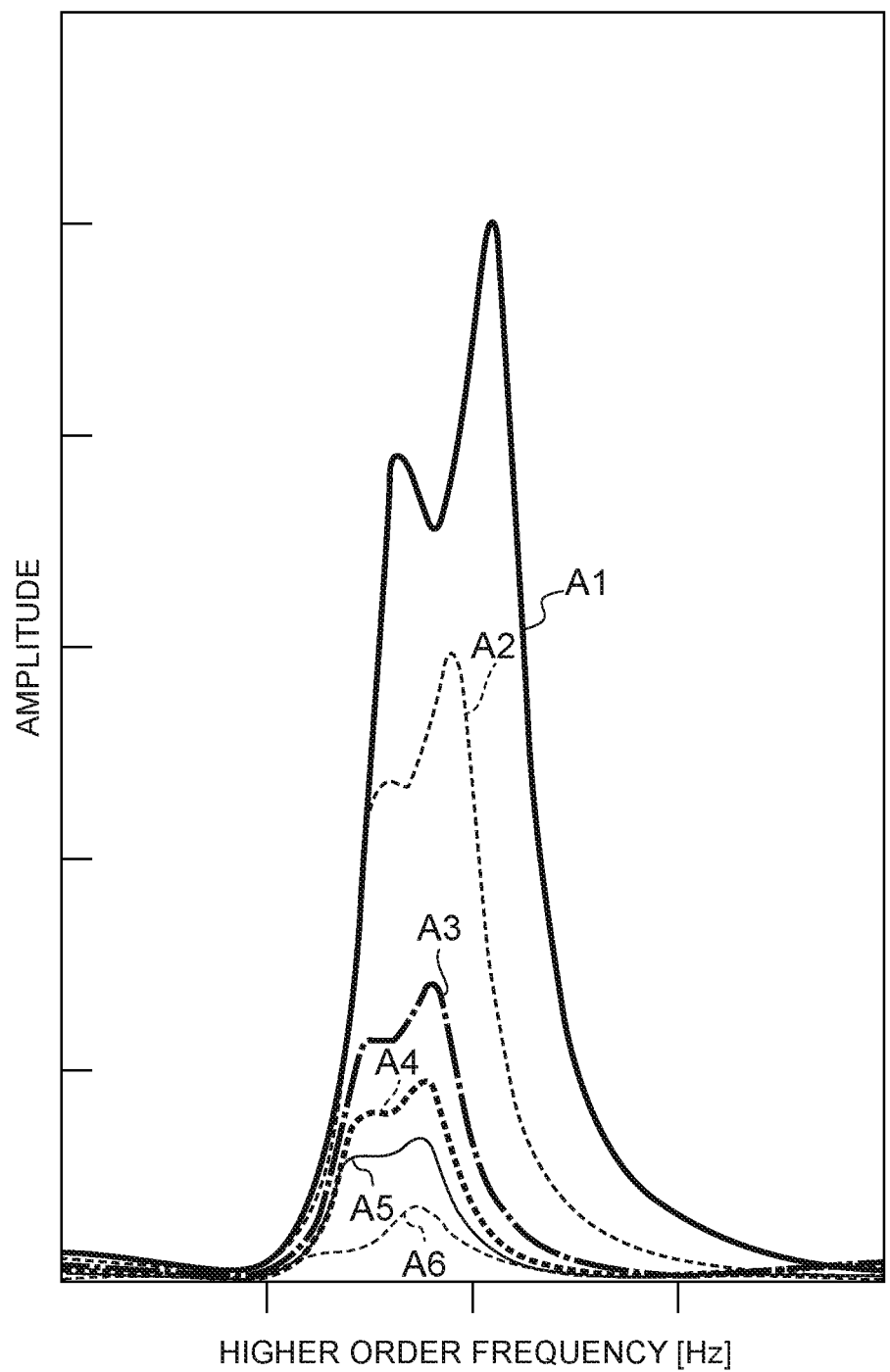
FIG. 4 is a graph showing a simulation result of relationship between an adhesive filling rate of a gap between the yoke and the hub shown in FIG. 1 and vibration generated in the hub.

FIG. 4 is a graph showing a simulation result of relationship between the adhesive filling rate of the gap S2 between the yoke 30 and the hub 10 in the spindle motor 1 according to the first embodiment of the present disclosure and vibration generated in the hub 10. The horizontal axis shows the frequency of 55 to 75 kHz and the vertical axis shows the vibration amplitude of each frequency. In the present simulation, the filling rate of the adhesive AD in the gap S2 was adjusted to different values to verify the effect of this variation. In addition, vibration from 55 to 75 kHz was applied to the rotor part 50. The present simulation was carried out considering Example of the spindle motor 1 according to the first embodiment of the present disclosure and Comparative Examples 1 to 5.

In Comparative Example 1, the gap S1 between the upper end surface 31a of the yoke 30 and the bottom surface 17a of the peripheral groove 17 was filled with the adhesive AD, and further, the gap S2 between the outer peripheral surface 32b of the yoke cylindrical part 32 and the inner peripheral surface 13a of the hub cylindrical part 13 was filled with the adhesive AD at 50% from the gap S1 side (corresponding to the vibration curve A1 in FIG. 4). In Comparative Example 2, the gap S1 was filled with the adhesive AD, and further, the gap S2 was filled with the adhesive AD at 33% from the gap S1 side (corresponding to the vibration curve A2 in FIG. 4). In Comparative Example 3, the gap S1 was filled with the adhesive AD and further, the gap S2 was filled with the adhesive AD at 25% from the gap S1 side (corresponding to the vibration curve A3 in FIG. 4).

In Comparative Example 4, the gap S1 was filled with the adhesive AD and further, the gap S2 was filled with the adhesive AD at 20% from the gap S1 side (corresponding to the vibration curve A4 in FIG. 4). In Comparative Example 5, the gap S1 was filled with the adhesive AD and further, the gap S2 was filled with the adhesive AD at 17% from the gap S1 side (corresponding to the vibration curve A5 in FIG. 4). In Example, the gap S2 was filled with the adhesive AD at 0% (corresponding to the vibration curve A6 in FIG. 4). In other words, in Example, as shown in FIG. 2, the adhesive AD remained on the inner side of the peripheral groove 17, the gap S1 was not filled with the adhesive AD and further, the gap S2 was also not filled with the adhesive AD.

As shown in FIG. 4, the simulation resulted in an amplitude distribution represented by the vibration curve A1 for Comparative Example 1 filling 50% of gap S2, the vibration curve A2 for Comparative Example 2 filling 33% of gap S2, the vibration curve A3 for Comparative Example 3 filling 25% of gap S2, the vibration curve A4 for Comparative Example 4 filling 20% of gap S2, the vibration curve A5 for Comparative Example 5 filling 17% of gap S2, and the vibration curve A6 for Example filling 0% of gap S2.

According to the simulation result shown in FIG. 4, the smaller the adhesive filling rate is, the more the amplitude of the vibration of the higher order frequency generated in the hub is reduced. In the spindle motor 1 according to the first embodiment of the present disclosure shown in Example, the gap S2 is formed between the yoke 30 and the hub 10, and the adhesive AD is not present on the radially outer side (arrow d direction) of the peripheral groove 17. In other words, the hub cylindrical part 13 and the yoke cylindrical part 32 do not contact each other. Thus, the transmission of the vibration of the higher order frequency caused by the rotational vibration generated between the stator 63 and the rotor magnet 40 to the hub 10 is reduced, hence allowing the generation of the vibration of the higher order frequency in the hub 10 to be reduced.

Figure 5:
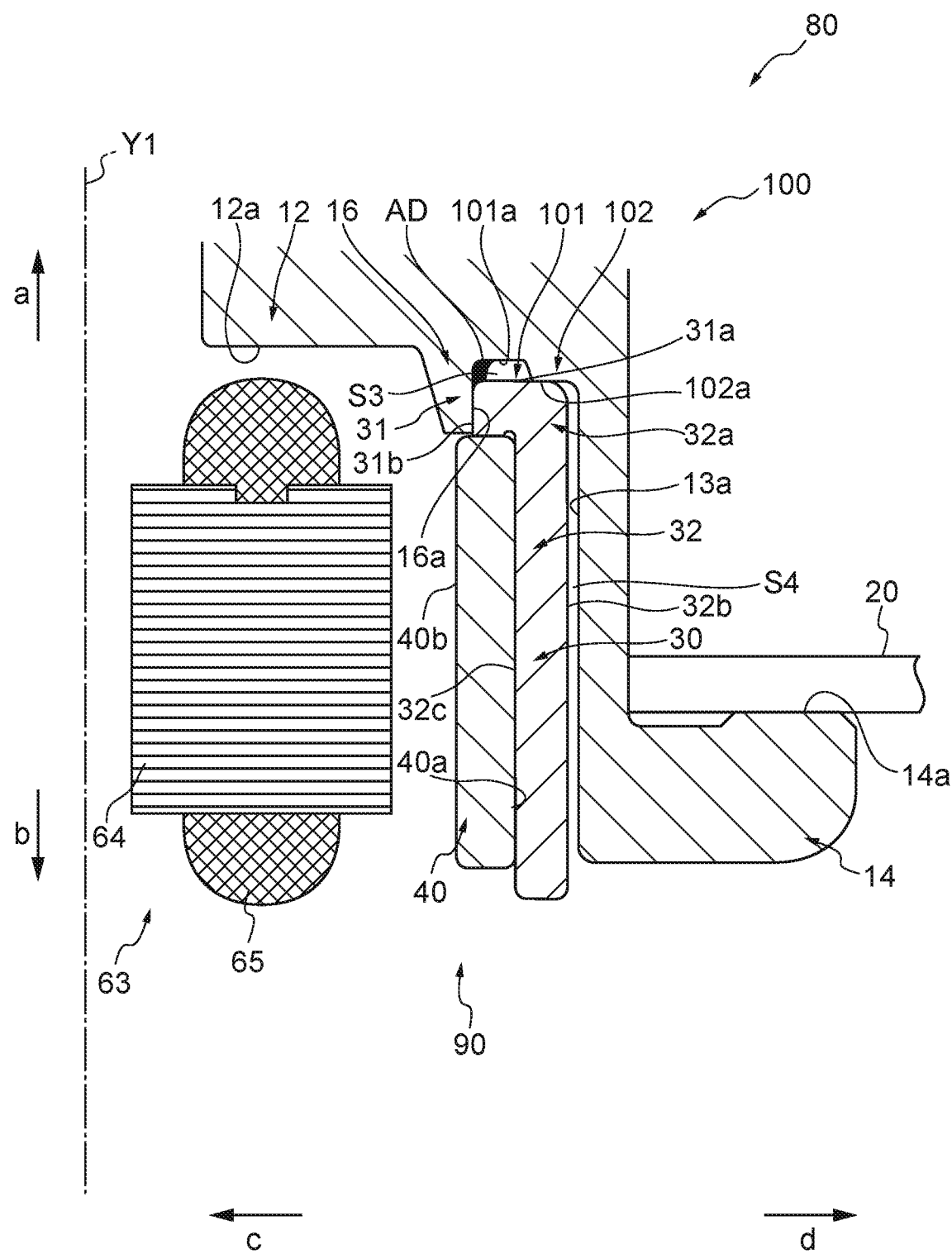
FIG. 5 is a partially enlarged cross-sectional view schematically showing a configuration of a rotor part of a spindle motor according to a second embodiment of the present disclosure.

Next, a configuration of a spindle motor 80 according to a second embodiment of the present disclosure will be described. FIG. 5 is a partially enlarged cross-sectional view schematically showing a configuration of a rotor part 90 of the spindle motor 80 according to the second embodiment of the present disclosure.

Hereinafter, the same or similar components as or to the components in the spindle motor 1 according to the above-described first embodiment are denoted with the same reference numerals and letters, the description for the same components is omitted, and only components differing from the components in the spindle motor 1 will be described. The spindle motor 80 according to the second embodiment of the present disclosure is different from the spindle motor 1 in configurations of the hub and the adhesive part. Specifically, in the spindle motor 80, instead of the hub 10, a hub 100 is provided. In addition, the adhesive part of the spindle motor 80 is constituted of a projecting part 16.

Specifically, in the hub 100, on the lower surface 12a of the disk part 12, a peripheral groove 101 is formed between the inner peripheral surface 13a of the hub cylindrical part 13 and the projecting part 16, and the peripheral groove 101 is connected to the projecting part 16 on an inner side (arrow c direction). In addition, in the hub 100, between the peripheral groove 101 and the inner peripheral surface 13a of the hub cylindrical part 13, the yoke supporting part 102 supporting the yoke 30 is provided on the lower surface 12a of the disk part 12.

The yoke supporting part 102 is formed on radially outward (arrow d direction) of the peripheral groove 101. The yoke supporting part 102 is formed on radially inward (arrow c direction) of the inner peripheral surface 13a of the hub cylindrical part 13 and is connected to the inner peripheral surface 13a of the hub cylindrical part 13 in the radial direction. The yoke supporting part 102 has a supporting surface 102a facing the yoke 30 and supporting the yoke 30.

The peripheral groove 101 is recessed in the axial direction toward an upper side (arrow a direction). The peripheral groove 101 extends in an annular shape with the axis Y1 as the center. The peripheral groove 101 is formed on the inner side (arrow c direction) of the yoke supporting part 102 and on the outer side (in the arrow d direction) of the projecting part 16. The peripheral groove 101 is formed between the yoke supporting part 102 and the projecting part 16 and is connected to the yoke supporting part 102 and an outer peripheral surface 16a of the projecting part 16. A bottom surface 101a (also a top surface in FIG. 5) of the peripheral groove 101 is formed on a lower side (arrow b direction) of the lower surface 12a of the disk part 12 and is formed on the upper side (arrow a direction) of the supporting surface 102a of the yoke supporting part 102.

An adhesive AD is present in an annular shape around the axis Y1 in at least one part of the upper side of the outer peripheral surface 16a and between at least one part of the inner side of the peripheral groove 17 and the yoke flange part 31 of the yoke 30. The adhesive AD is not present on the outer side of the peripheral groove 101 and a surface of the adhesive AD is exposed inside the peripheral groove 101.

At least one part of an upper end surface 31a of the yoke flange part 31 on the outer side faces the supporting surface 102a of the yoke supporting part 102 contacting the supporting surface 102a and is supported by the supporting surface 102a. At least one part of the upper end surface 31a on the inner side faces the bottom surface 101a of the peripheral groove 101, and between at least one part of the inner side of the upper end surface 31a and the bottom surface 101a of the peripheral groove 101, a gap S3 is formed in the axial direction.

An inner peripheral surface 31b of the yoke flange part 31 faces the outer peripheral surface 16a of the projecting part 16. The diameter of the inner peripheral surface 31b is smaller than the diameter of the outer peripheral surface 16a. Accordingly, the inner peripheral surface 31b is fitted to the outer peripheral surface 16a with interference.

The hub cylindrical part 13 and a yoke cylindrical part 32 do not contact each other. Specifically, the width of the yoke flange part 31 in the radial direction is smaller than the total width of the width of the supporting surface 102a in the radial direction and the width of the peripheral groove 101 in the radial direction. Accordingly, between an outer peripheral surface 32b of the yoke cylindrical part 32 and the inner peripheral surface 13a of the hub cylindrical part 13 of the hub 100, a gap S4 is formed in the radial direction. Note that the gap S4 is formed to be apart from the peripheral groove 101 and does not communicate with the peripheral groove 101.

At least one part of the upper side of the inner peripheral surface 31b is bonded to the outer peripheral surface 16a by the adhesive AD. The adhesive AD remains in one part of the inner side between at least one part of the upper end surface 31a and the bottom surface 101a of the peripheral groove 101. The adhesive AD does not reach the yoke supporting part 102 and the peripheral groove 101 is not filled completely with the adhesive AD. Note that although the whole of the peripheral groove 101 may be filled with the adhesive AD, the adhesive AD should not reach the gap S4 beyond the peripheral groove 101 and the yoke supporting part 102.

Figure 6:
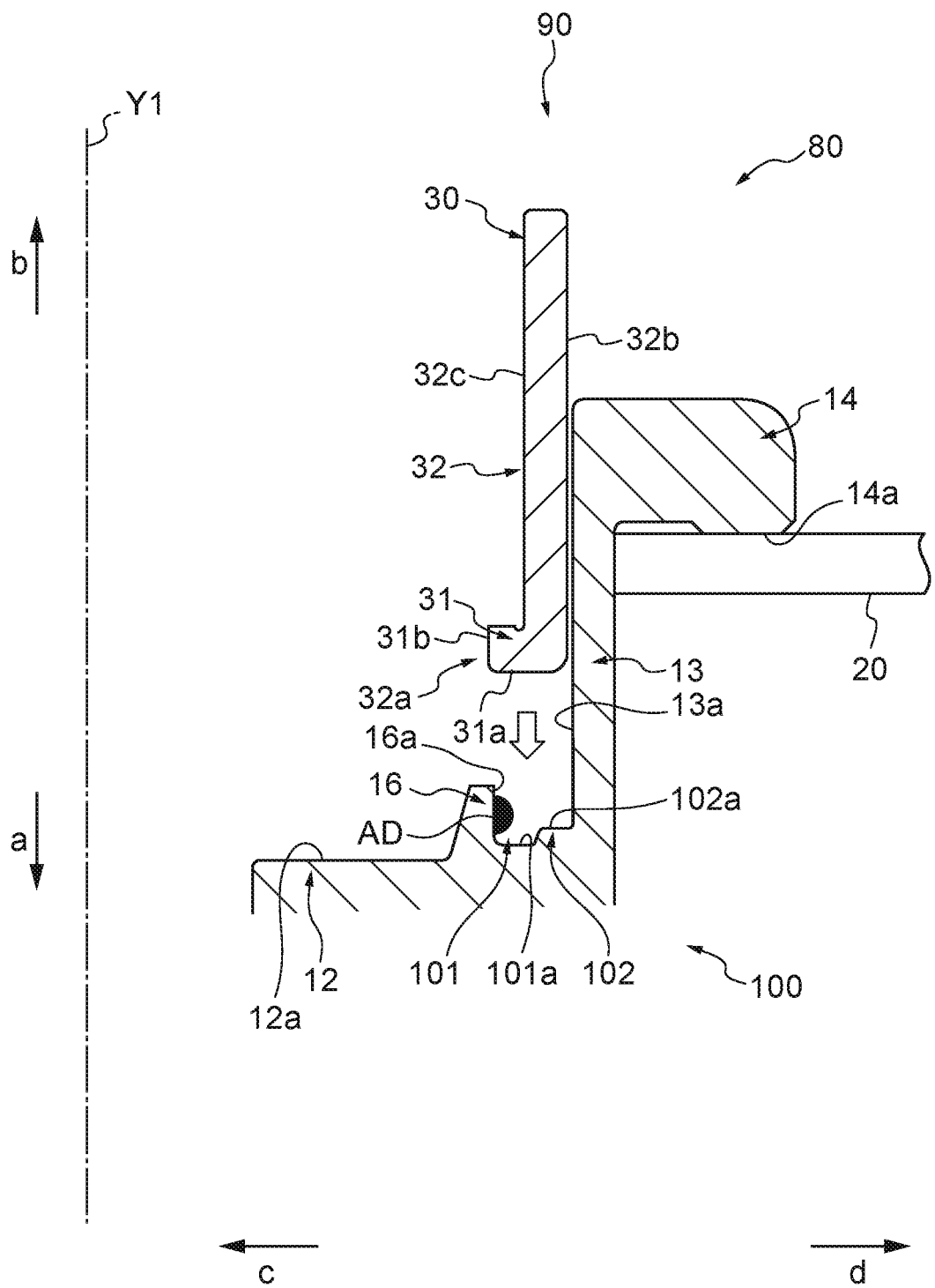
FIG. 6 is a diagram illustrating a method of attaching a yoke and a hub shown in FIG. 5.

Subsequently, a method of attaching the yoke 30 and the hub 100 in the spindle motor 80 having the above-described configuration will be described. FIG. 6 is a diagram illustrating the method of attaching the yoke 30 and the hub 100 in the spindle motor 80 according to the second embodiment of the present disclosure. First, as shown in FIG. 6, the upper side and the lower side of the hub 100 are reversed in relation to the position in FIG. 5. The adhesive AD is dropped or applied to the outer peripheral surface 16a of the projecting part 16.

The amount of the adhesive AD is adjusted to an amount to remain in at least one part of the upper side between the inner peripheral surface 31b of the yoke flange part 31 and the outer peripheral surface 16a of the projecting part 16 and in at least one part of the inner side between at least one part of the upper end surface 31a and the bottom surface 101a of the peripheral groove 101.

Subsequently, the yoke 30 is fitted with interference to the outer peripheral surface 16a such that the inner peripheral surface 31b contacts the outer peripheral surface 16a, and the adhesive AD is cured. Thus, at least one part of the outer side of the upper end surface 31a is supported onto the supporting surface 102a so as to contact the supporting surface 102a. Since the diameter of the inner peripheral surface 31b is smaller than the diameter of the outer peripheral surface 16a, the yoke 30 can be fitted with interference into the projecting part 16 of the hub 100. In addition, the outer peripheral surface 16a and the inner peripheral surface 31b are bonded to each other by the adhesive AD applied between the outer peripheral surface 16a and the inner peripheral surface 31b.

As described above, in the spindle motor 80 according to the second embodiment of the present disclosure, the disk part 12 includes the adhesive part (the projecting part 16) with the yoke flange part 31 fixed via the adhesive AD and the peripheral groove 101 formed on radially outward (arrow d direction) of the adhesive part (the projecting part 16). At this time, the adhesive AD is not present on radially outward (arrow d direction) of the peripheral groove 101, and the hub cylindrical part 13 and the yoke cylindrical part 32 do not contact each other.

The peripheral groove 101 is formed between the projecting part 16 and the yoke supporting part 102 and is connected to the projecting part 16 and the yoke supporting part 102. In addition, between the peripheral groove 101 and the inner peripheral surface 13a of the hub cylindrical part 13, the yoke supporting part 102 supporting the yoke 30 is provided. Therefore, the gap S4 formed between the outer peripheral surface 32b of the yoke cylindrical part 32 and the inner peripheral surface 13a of the hub cylindrical part 13 is formed to be apart from the peripheral groove 101 and does not communicate with the peripheral groove 101.

Accordingly, filling the gap S4 between the outer peripheral surface 32b of the yoke cylindrical part 32 and the inner peripheral surface 13a of the hub cylindrical part 13 with the adhesive AD is effectively prevented. Therefore, transmission of vibration of the higher order frequency (for example, 55 to 75 kHz band) caused by rotational vibration generated between the stator 63 and the rotor magnet 40 to the hub 100 is reduced, thus reducing the generation of vibration of the higher order frequency on the disk 20 attached to the hub 100.

Hereinbefore, the embodiments of the present disclosure were described. However, the present disclosure is not limited to the above-described embodiments and includes all modes embraced in the concept of the present disclosure and the scope of the appended claims. In addition, in order to exhibit at least one part of the above-described solution and effects, the respective components may be appropriately combined. For example, shapes, materials, ways of arrangement, sizes, and the like of the respective components in the above-described embodiments may be appropriately modified depending on a specific mode of use of the present disclosure.

Figure 7:
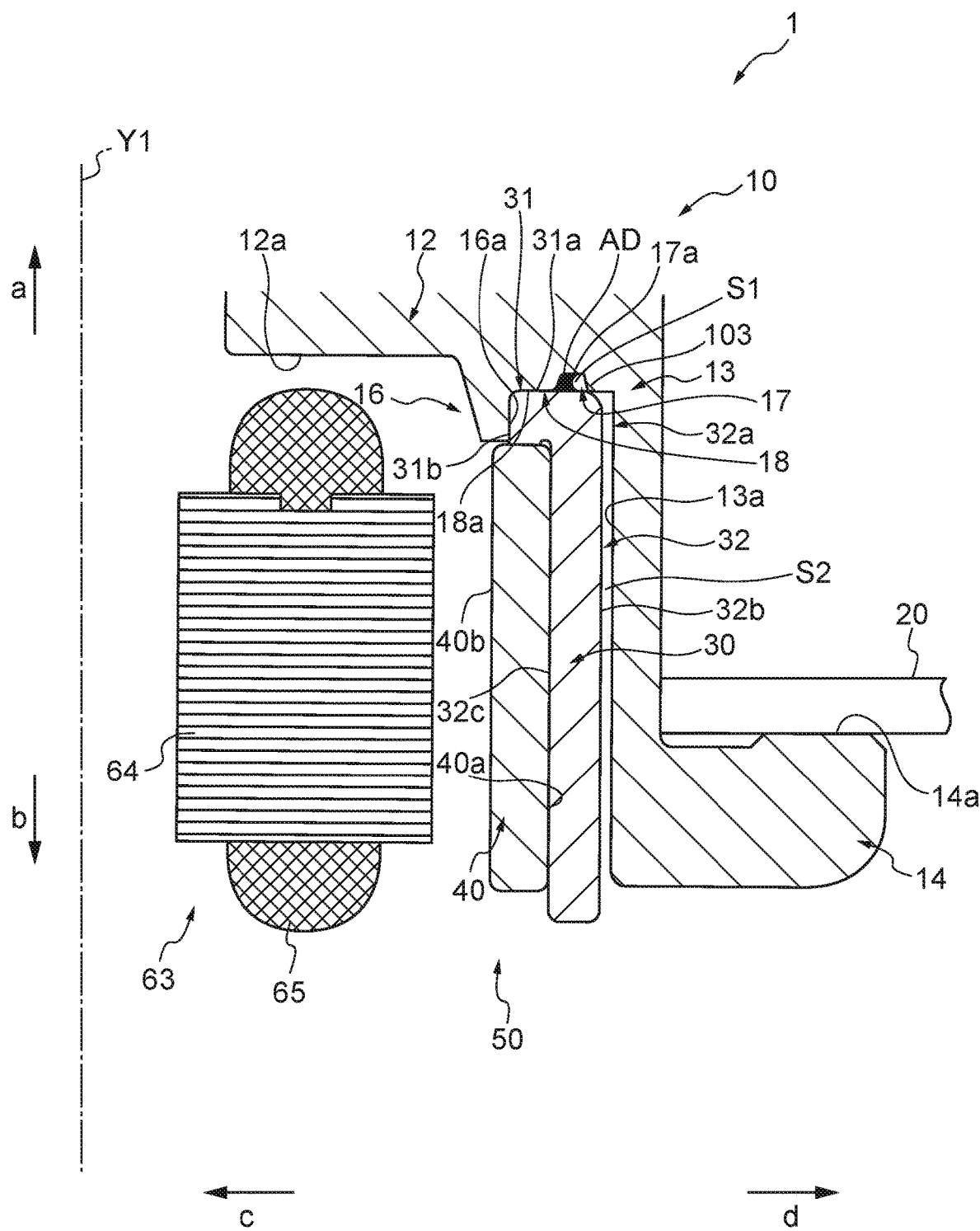
FIG. 7 is a partially enlarged cross-sectional view schematically showing a configuration of other variant of the spindle motor according to the first embodiment of the present disclosure.

For example, the spindle motor 1 according to the first embodiment of the present disclosure including the disk part 12, the disk part 12 having the adhesive part (the projecting part 16 and the yoke supporting part 18) with the yoke flange part 31 fixed via the adhesive AD and the peripheral groove 17 formed on the radially outer side (arrow d direction) of the adhesive part, was described as one example. However, the present disclosure is not limited to the above-mentioned spindle motor 1, and as shown in FIG. 7, the spindle motor may include an outer side yoke supporting part 103 between the peripheral groove 17 and the hub cylindrical part 13. The outer side yoke supporting part 103 extends in an annular shape with the axis Y1 as the center. The outer side yoke supporting part 103 is formed on the inner side (in the arrow c direction) of the inner peripheral surface 13a of the hub cylindrical part 13 and is connected to the inner peripheral surface 13a in the radial direction.

In addition, each of the spindle motors 1 and 80 according to the first and second embodiments of the present disclosure, each including the disk part 12 with the yoke flange part 31 fixed via the adhesive AD, was described as one example. However, the present disclosure is not limited to each of the spindle motors 1 and 80, and the yoke flange part 31 may be fixed without the adhesive AD. Even in such a case, in each of the spindle motors 1 and 80, since the diameter of the inner peripheral surface 31b of the yoke flange part 31 is smaller than the diameter of the outer peripheral surface 16a of the projecting part 16, by fitting the yoke 30 into the hub 10, effects similar to the effects of the first and second embodiments of the present disclosure can be obtained.

What is claimed is:

1. A spindle motor comprising:
a hub;
a yoke;
a rotor magnet; and
a stator, wherein
the hub is formed in a cup shape having a hub cylindrical part extending in an axial direction and a disk part extending from an end of the hub cylindrical part toward an inner side in a radial direction,
the yoke arranged on an inner side of the hub in the radial direction is formed in an annular shape having a yoke cylindrical part facing the hub cylindrical part and a yoke flange part facing the disk part and extending radially inward from an end of the yoke cylindrical part, the yoke flange part having an upper end surface,
the disk part includes an adhesive part with the yoke flange part being fixed via an adhesive and a peripheral groove recessed in the axial direction being formed on radially outward of the adhesive part, the yoke flange part physically contacting a portion of the adhesive part,
the adhesive is not present on radially outward of the peripheral groove,
the hub cylindrical part and the yoke cylindrical part do not contact each other, and
a gap is formed between the upper end surface of the yoke flange part and a bottom surface of the peripheral groove, and wherein the adhesive does not reside in a portion of the gap.

2. The spindle motor according to claim 1, wherein after curing, a surface of the adhesive is exposed inside the peripheral groove.

3. The spindle motor according to claim 2, wherein a depth of the peripheral groove in the axial direction continuously increases toward an outer side in the radial direction in a portion from an edge portion up to a deepest portion of the peripheral groove.

4. The spindle motor according to claim 2, wherein the disk part includes a projecting part with the yoke flange part being fitted on an inner side of the peripheral groove in the radial direction.

5. The spindle motor according to claim 4, wherein the adhesive part includes the projecting part.

6. The spindle motor according to claim 1, wherein a depth of the peripheral groove in the axial direction continuously increases toward an outer side in the radial direction in a portion from an edge portion up to a deepest portion of the peripheral groove.

7. The spindle motor according to claim 1, wherein the disk part includes a projecting part with the yoke flange part being fitted on an inner side of the peripheral groove in the radial direction.

8. The spindle motor according to claim 7, wherein the adhesive part includes the projecting part.

* * * * *